United States Patent
Kammlott et al.

Patent Number: 5,414,788
Date of Patent: May 9, 1995

[54] METHOD AND APPARATUS FOR FUSION SPLICING OPTICAL FIBERS

[75] Inventors: Guenther W. Kammlott, Watchung; Sandra G. Kosinski, Murray Hill; John T. Krause, New Providence; Richard S. Riggs, Branchburg Township, Somerset County, all of N.J.

[73] Assignee: AT&T Corp., Murray Hill, N.J.

[21] Appl. No.: 267,704

[22] Filed: Jun. 28, 1994

Related U.S. Application Data

[63] Continuation of Ser. No. 56,971, May 3, 1993, abandoned.

[51] Int. Cl.6 ............................................. G02B 6/36
[52] U.S. Cl. ........................................ 385/96; 385/97; 385/98
[58] Field of Search ............... 385/95, 96, 97, 98, 385/99, 135, 139; 219/121.13, 121.14

[56] References Cited

U.S. PATENT DOCUMENTS

| | | | |
|---|---|---|---|
| 4,049,414 | 9/1977 | Smith | 385/96 X |
| 4,383,844 | 5/1983 | Kashima et al. | 219/383 X |
| 4,689,065 | 8/1987 | Krause | 65/2 |
| 4,713,105 | 12/1987 | Krause et al. | 65/4 |
| 4,735,481 | 4/1988 | Lukas et al. | 385/96 X |
| 4,958,905 | 9/1990 | Tynes et al. | 65/42/ |
| 5,249,247 | 9/1993 | Whitesmith | 219/121.11 X |

FOREIGN PATENT DOCUMENTS

| | | |
|---|---|---|
| 62-099704 | 5/1987 | Japan . |
| 3-113403 | of 1989 | Japan . |
| 62-99704 | 9/1990 | Japan . |
| 2180369 | 3/1987 | United Kingdom . |

OTHER PUBLICATIONS

D. L. Bisbee, "Splicing Silica Fibers With An Electric Arc" *Applied Optics*, vol. 15, No. 3, (Mar. 1976) pp. 796–798.

D. L. Bisbee, "Optical Fiber Joining Technique," *Bell System Technical Journal*, vol. 50, No. 10, (Jul. 1971) pp. 3153–3158.

J. D. Cobine, Electrical Engineering Texts, *Gaseous Conductors*, Theory and Engineering Applications, First Edition, Sec. 9.3 pp. 300–311 (1941).

"Fusion Splicing Machine for Optical Fiber", Hideichiro et al, Oct. 26, 1988, Patent Abstract of Japan (JP 63-259602).

"Connecting Method of Optical Fibers by Arc Welding", Toshiaki et al, Feb. 8, 1984, Patent Abstract of Japan (JP 59-024815).

*Primary Examiner*—Rodney B. Bovernick
*Assistant Examiner*—Hemang Sanghavi
*Attorney, Agent, or Firm*—Eileen D. Ferguson

[57] ABSTRACT

We have discovered that the strength of arc fusion splices in optical fiber can be adversely affected by particles (e.g., $SiO_2$ particles) from the electrodes. Disclosed is a method of arc fusion splicing that can substantially increase the probability that a given fiber splice will meet a given strength requirement. The method comprises initiating the arc in a "cleaning" position selected such that the probability of incidence on the fibers of particles from the electrodes is relatively low, followed by changing the relative position between the electrodes with the arc therebetween and the fibers to the conventional "heating" position and forming the splice.

6 Claims, 3 Drawing Sheets

METHOD AND APPARATUS FOR FUSION SPLICING OPTICAL FIBERS

This application is a continuation of application Ser. No. 08/056971, filed on May 3, 1993, now abandoned.

FIELD OF THE INVENTION

This invention relates to a method and apparatus for arc fusion splicing optical fibers.

BACKGROUND OF THE INVENTION

For many optical fiber applications, it is necessary to splice two separate lengths of fiber together to form a single spliced length of fiber. Frequently, these splices need to have high strength, comparable to the strength of the fiber.

Among known fiber splicing techniques is arc fusion splicing, which can be an automated process. Exemplarily, a computer controlled fiber positioner aligns the fiber ends face-to-face until optimum fiber-to-fiber optical transmission is achieved. A current is then supplied to two electrodes, with the resulting electric arc heating the optical fibers such that the two abutting fiber ends are fused together. See, for instance, D. L. Bisbee, "Splicing Silica Fibers With an Electric Arc", Applied Optics, Vol. 15, No. 3, Mar. 1976, pp. 796–798.

It is known that optical fiber splices that are formed by means of arc fusion frequently have relatively low strength, frequently less than half of the intrinsic strength of the glass. This is a drawback that limits the usefulness of this, otherwise advantageous, splicing technique. Thus, it would be desirable to have available an arc fusion splicing method and apparatus that can produce a higher percentage of high strength splices than is typically obtained with prior art techniques and apparatus. This application discloses such a method.

THE INVENTION

This invention is embodied in a method and apparatus for splicing the ends of two optical fibers to form a single length of optical fiber, and can yield a higher percentage of splices of strength above a given minimum strength than is typically attained with prior art arc fusion methods and apparatus.

Figure 1:
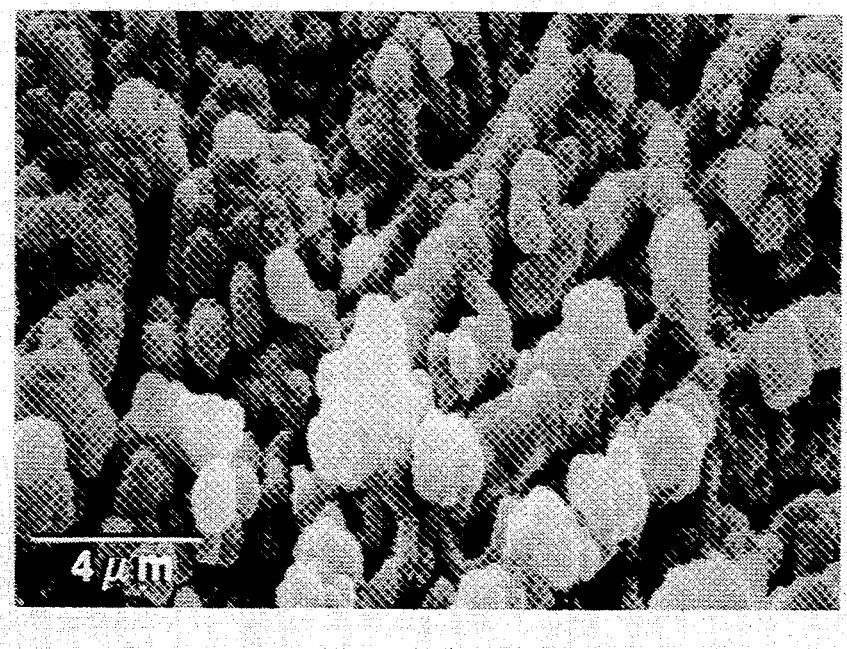
FIG. 1 shows an exemplary SEM (scanning electron microscope) micrograph of an electrode tip.
Figure 2:
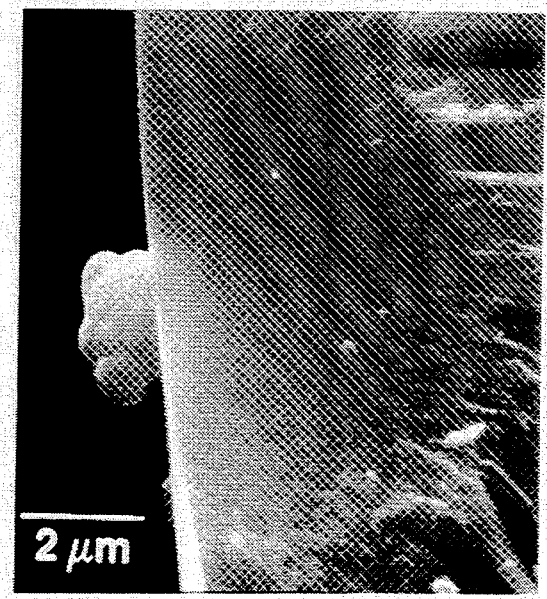
FIG. 2 shows a SEM micrograph of a portion of a fiber fracture surface with associated particle.

We have made the surprising discovery that the, frequently observed, relatively high percentage of low strength arc fusion splices is typically associated with particulate emission from the electrodes, especially during the initial period of arc operation. FIG. 1 is a SEM micrograph of the tip of an electrode and shows a plethora of particles, typically $SiO_2$ particles, believed to have been deposited during previous arc fusion splicing operations. Incidence of a particle on one of the optical fibers being spliced can result in a relatively low strength splice, since the particle can act as stress concentrator. FIG. 2 is a SEM micrograph of a fracture surface of an arc fusion spliced silica fiber, and shows a silica particle associated with the fracture. It is thus an object of the invention to provide an arc fusion method (and apparatus for the practice of the method) that at least significantly reduces the probability that a particle from an electrode is incident on the optical fiber.

More specifically, the inventive method of end-to-end fusion splicing two lengths of optical fiber typically comprises positioning an end of each of the lengths of fiber such that the ends are substantially aligned in linear opposing fashion, and fusing the fiber ends by a process that comprises heating the ends by means of an electric arc between electrodes, with the electrodes in a first ("heating") position relative to the fiber ends. Significantly, the method also comprises starting the arc with the electrodes in a second ("cleaning") position relative to the fiber ends, and maintaining the electrodes with the arc therebetween in the cleaning position for at least a time $t_c$, followed by placing the electrodes with the arc therebetween and the fiber ends in said heating position. Associated with the electrodes with the arc therebetween is a rate of particle emission, and $t_c$ is the time at which the rate of particle emission has dropped to 50% of the initial rate of particle emission at the time the arc is started. Preferably the change from the cleaning to the heating position is not made until the particle emission rate has dropped below 90% of the initial rate. This time can be as short as a fraction of a second, possibly a few seconds, since the rate of particle emission typically is high when the arc is struck, but drops rapidly thereafter.

The invention is also embodied in fusion splicing apparatus that comprises means for holding an end portion of each of two lengths of optical fibers, means for aligning the ends, means for maintaining an electric arc between (two or possibly more) electrodes, and means that facilitate placing said fiber ends and said electrodes into a first and a second position relative to each other, with the first ("heating") position selected such that the arc can heat said fiber ends, and the second ("cleaning") position preferably selected such that substantially no particles emitted from the electrodes with the arc therebetween can reach the fiber ends.

Figure 3:
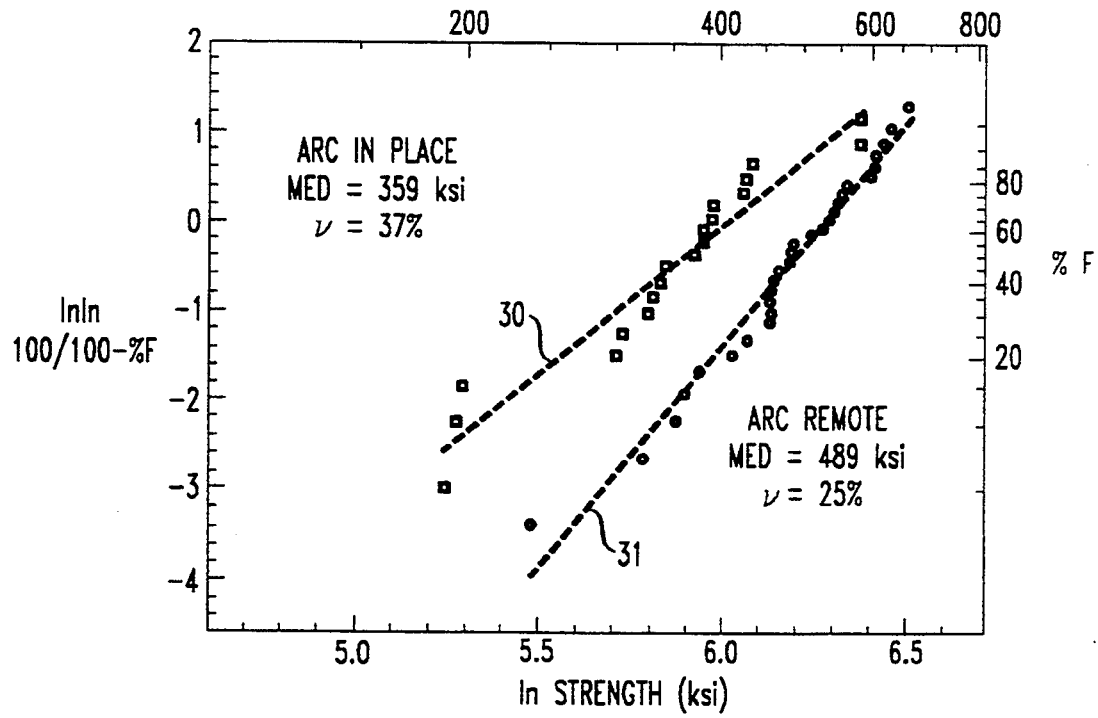
FIGS. 3 and 4 present exemplary strength data for fibers spliced according to the invention and according to the prior art.
Figure 4:
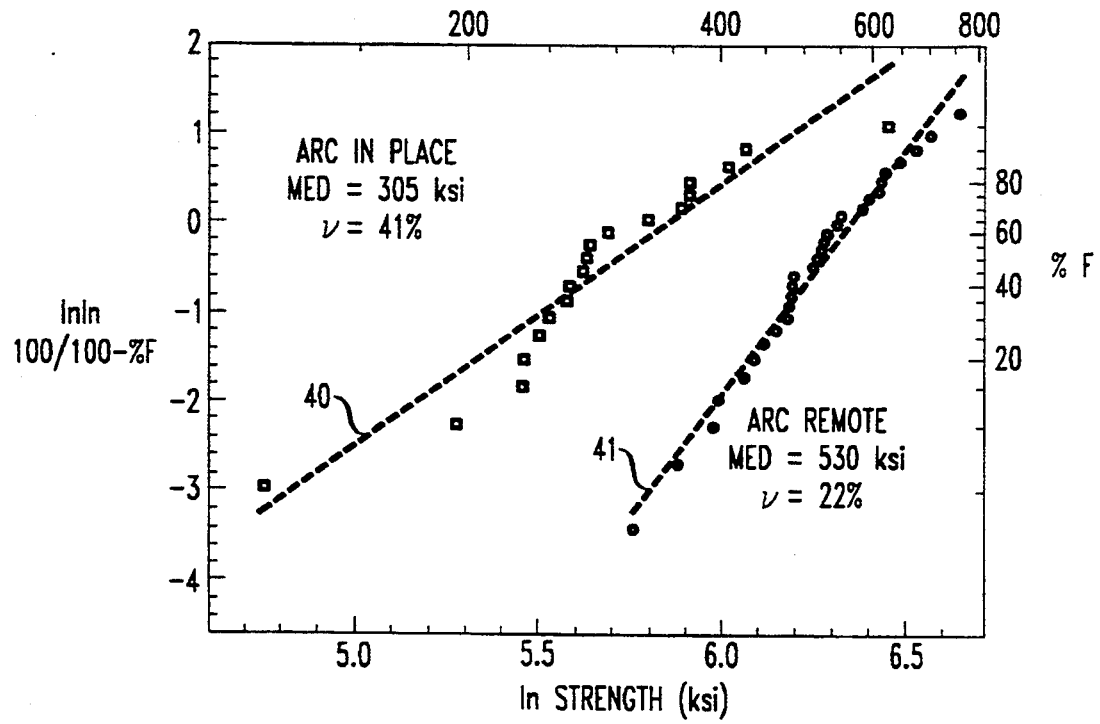

The effectiveness of the method according to the invention is illustrated by the exemplary data of FIGS. 3 and 4, wherein numerals 30 and 40 refer to prior art results, and 31 and 41 to fibers spliced according to the invention. The data of curve 31 were obtained from conventional optical fibers that were arc fusion spliced according to one embodiment of the invention, namely, by a method that involves maintaining the fiber ends in close proximity to each other, and moving the electrodes with the arc therebetween from the cleaning position into the heating position. On the other hand, the data of FIG. 4 were obtained from such fibers that were arc fusion spliced according to another embodiment of the invention, namely, by a method that involves placing the fiber ends into a facing position, with the ends separated from each other by a significant distance, starting the arc, and moving the fiber ends from the cleaning (remote from each other) to the heating (adjacent to each other) position without movement of the electrodes.

As FIGS. 3 and 4 show, both embodiments of the invention yield substantial improvement in splice strength, e.g., from median strengths of 359 and 305 ksi (2.48 and 2.10 GPa, respectively) to 489 and 530 ksi (3.37 and 3.66 GPa, respectively), respectively. Clearly, in both cases a substantially higher percentage of splices made according to the invention passes at a given test level (e.g., at 400 ksi, i.e., 2.76 GPa) than do fibers spliced according to the prior art. Furthermore, the values for splices made according to the invention are less widely scattered (as expressed by the coefficient of variation v) than those made by the prior art technique. Differences in median value between the corresponding data of FIGS. 3 and 4 are currently not considered to be significant.

Figure 5:
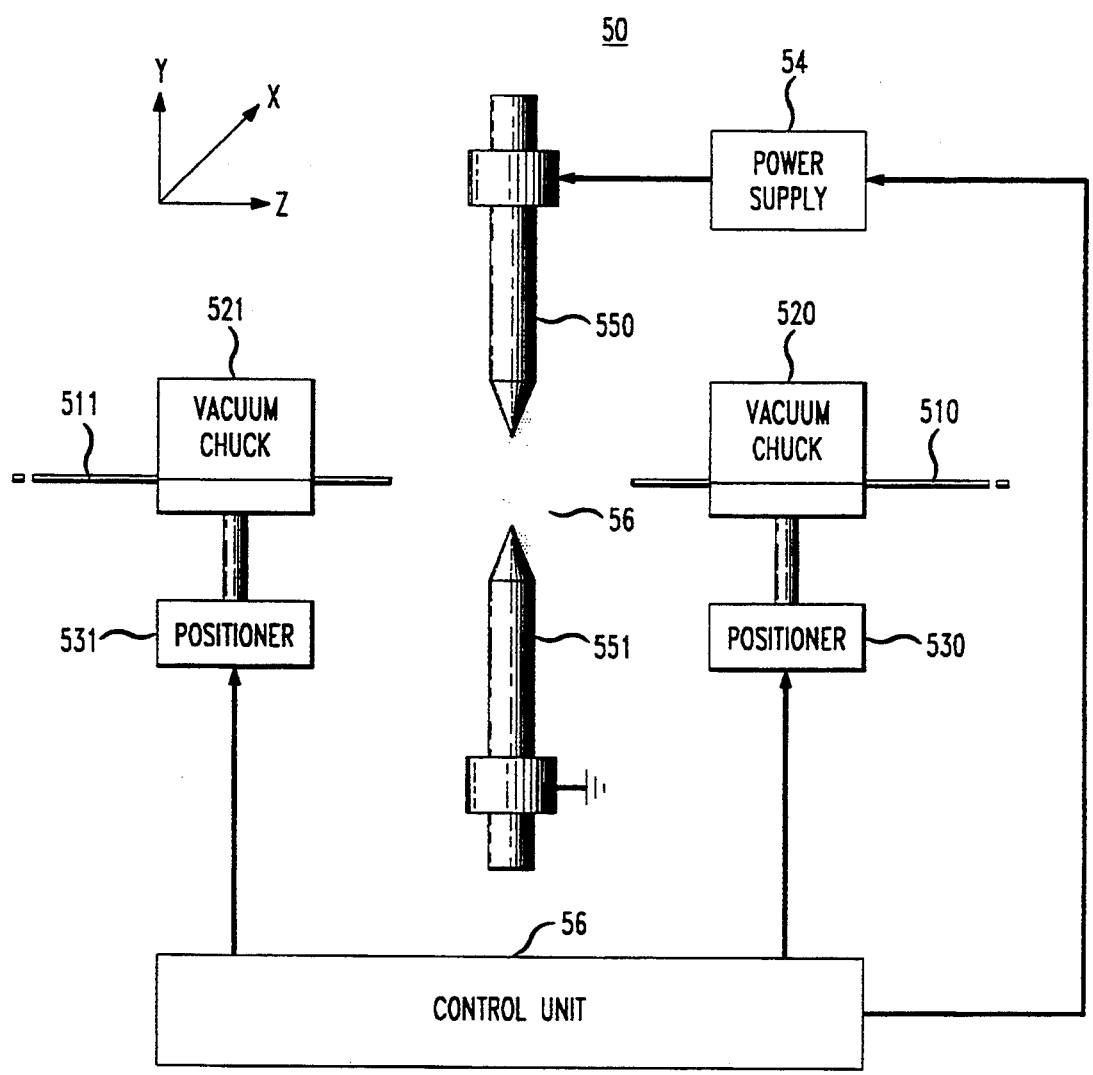
FIG. 5 schematically depicts exemplary apparatus according to the invention.

FIG. 5 schematically depicts an exemplary embodiment of apparatus according to the invention. Fusion splicer 50 comprises fiber holding means 520 and 521 (e.g., known vacuum chucks), fiber aligning means 530 and 531 (e.g., comprising known servo-controlled micropositioning means), and means for maintaining an arc (comprising an appropriate power supply 54) between electrodes 550 and 551. FIG. 5 also shows optical fibers 510 and 511, control unit 54, and arc 56. Exemplarily, the Z-direction is parallel the fiber axis, the X-Z plane is the "horizontal" plane, and the Y direction is normal to the X-Z plane, positioning means 530 can adjust the position of the fiber 510 in the Y and Z directions, and positioning means 531 can adjust the position of fiber 511 in the X and Z directions. As seen in FIG. 5, fibers 510 and 511 are positioned outside arc 56 during the cleaning process.

Those skilled in the art will appreciate that FIG. 5 is a schematic illustration of functional elements, and that various (necessary but conventional) parts are not shown. For instance, all the parts shown in FIG. 5 will typically be integrated into a single unit, requiring provision of mounting means and housing means. Indeed, apparatus according to the invention is likely to resemble prior art apparatus (e.g., Ericsson 905 Fusion Splicer), but comprising the additional features (possibly embodied in software) that enable it to carry out the inventive method.

On a modified 905 Fusion Splicer, the method was practiced as follows. After conventional preparatory steps such as coating stripping, fiber cleaning and cleaving, the fibers were mounted in the apparatus, and positioned such that the ends almost touched, and the fibers were optically aligned in the X and Y directions. Next, each fiber was moved about 2 mm in the Z-direction, away from the electrodes, resulting in a 4 mm separation between the fiber ends. This is the "cleaning" position in this exemplary embodiment. After attainment of the cleaning position, the arc was initiated (e.g., 6 mA current) and maintained. A few moments (e.g., 3 seconds) after arc initiation the fibers were moved in the Z-direction until the ends are just touching. This is the conventional heating position. The current was increased to 10.5 mA, the fiber Z-direction movement continued (about 15 µm), current was increased (to about 16.3 mA), such that fusion occurred, with continued fiber Z-direction movement (about 6 µm). This completed the process. Current was shut off, and the optical loss of the splice measured. This was followed by conventional steps such as annealing and re-coating of the splice region.

Clearly, the geometrical relationship between electrodes and fibers in the cleaning and heating positions, respectively, is a matter of design choice, and those skilled in the art will be able to devise many different embodiments other than the above described one. All such embodiments are contemplated, provided only that they meet the requirement that the probability of particle incidence on the fiber from the electrodes is substantially reduced (e.g., by at least 50%, preferably at least 90%). We would like to emphasize that the rate of particle emission typically is highest at the moment of arc initiation, dropping typically rapidly thereafter. Rate of particle emission can, at least in principle, be readily determined, e.g., by means of a deposition rate monitor.

Among contemplated embodiments is apparatus that comprises means for moving the electrodes (typically tungsten) to the cleaning position and the heating position. This is readily implemented by connecting the electrode holders to (servo-controlled or manual) positioning means. Exemplarily, the electrodes are moved 5 mm or more in the Y-direction. Hybrid embodiments (e.g., embodiments comprising movement of the electrodes as well as of the fibers) are also contemplated.

Also among contemplated embodiments is apparatus that provides a physical barrier between the electrodes and the fiber at arc initiation and for a few moments thereafter, with no movement of either the electrodes or the fibers. Such a barrier could be a silica sleeve or sleeves.

We claim:

1. A method for fusion splicing two lengths of optical fiber comprising:
   providing at least two electrodes having an electric arc-forming space therebetween, said electrodes having associated therewith a rate of particle emission including an initial rate of particle emission at the time the arc is started,
   positioning an end of each of two lengths of optical fiber such that the fiber ends are substantially aligned in a linearly opposed manner and such that the fiber ends are positioned outside the electric arc-forming space;
   initiating an electric arc between said at least two electrodes for at least a time $t_c$, where $t_c$ is the time at which the rate of particle emission is 50% of the initial rate of particle emission;
   positioning the fiber ends within the electric arc-forming space;
   fusing the fiber ends by heating with an electric arc formed within the electric arc-forming space.

2. A method according to claim 1 wherein the fiber ends are moved and the at least two electrodes are not moved between the position outside the electric arc-forming space and the position within the electric arc forming space.

3. A method according to claim 1 wherein the at least two electrodes are moved and the fiber ends are not moved between the position outside the electric arc-forming space and the position within the electric arc forming space.

4. A method according to claim 1 wherein the fiber ends and the at least two electrodes are moved between the position outside the electric arc-forming space and the position within the electric arc forming space.

5. A method according to claim 1 wherein each of the two lengths of optical fiber includes a core and said step of positioning the fiber ends includes aligning the cores.

6. A method according to claim 1 wherein the positioned outside the electric arc-forming space comprises placing a physical barrier between the at least two electrodes and the fiber ends.

* * * * *